(12) United States Patent
Erdozain, Jr. et al.

(10) Patent No.: US 10,059,440 B2
(45) Date of Patent: *Aug. 28, 2018

(54) PROPELLER ALIGNMENT DEVICES

(71) Applicant: Amazon Technologies, Inc., Seattle, WA (US)

(72) Inventors: Jack Erdozain, Jr., Miami, FL (US); Louis LeRoi LeGrand, III, Seattle, WA (US); Joshua White Traube, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/826,470

(22) Filed: Nov. 29, 2017

(65) Prior Publication Data

US 2018/0079497 A1    Mar. 22, 2018

Related U.S. Application Data

(63) Continuation of application No. 14/967,070, filed on Dec. 11, 2015, now Pat. No. 9,878,784.

(51) Int. Cl.
*B64C 27/00* (2006.01)
*B64C 27/58* (2006.01)
(Continued)

(52) U.S. Cl.
CPC .............. *B64C 27/58* (2013.01); *B64C 27/12* (2013.01); *B64C 39/024* (2013.01); *H02K 7/114* (2013.01);
(Continued)

(58) Field of Classification Search
CPC ........ B64C 2201/024; B64C 2201/042; B64C 2201/108; B64C 27/12; B64C 27/58;
(Continued)

(56) References Cited

U.S. PATENT DOCUMENTS 4,345,192 A * 8/1982 Kohzai ................. G05B 19/39
                                                              318/592
4,729,753 A * 3/1988 Neathery ................ B64C 27/35
                                                              416/102
(Continued)

FOREIGN PATENT DOCUMENTS

WO          2013066477          5/2013

OTHER PUBLICATIONS

U.S. Appl. No. 14/967,070, "Notice of Allowance", dated Sep. 27, 2017, 13 pages.

(Continued)

*Primary Examiner* — Medhat Badawi
(74) *Attorney, Agent, or Firm* — Kilpatrick Townsend & Stockton LLP

(57) ABSTRACT

A propeller alignment device is described. The propeller alignment device can include a second retainer attached to a propeller and a motor. The propeller alignment device can also include a first retainer that does not rotate, but that is aligned with the second retainer. The first retainer can include two or more magnets oppositely orientated relative to each other. The second retainer can also include two or more magnets oppositely orientated relative to each other. As the second retainer rotates relative to the first retainer, the magnets alternatingly align with each other. In the absence of a current applied to the motor, the magnets may magnetically bias the second retainer into a predetermined orientation relative to the first retainer.

20 Claims, 7 Drawing Sheets

(51) Int. Cl.
  *H02K 49/10* (2006.01)
  *H02K 7/114* (2006.01)
  *B64C 39/02* (2006.01)
  *B64C 27/12* (2006.01)

(52) U.S. Cl.
  CPC ........ H02K 49/10 (2013.01); *B64C 2201/024* (2013.01); *B64C 2201/042* (2013.01); *B64C 2201/108* (2013.01)

(58) Field of Classification Search
  CPC ............... B64C 39/024; B64C 27/04; B64C 2700/6281; B64C 27/10; B64C 27/52; H02K 49/10; H02K 7/114
  See application file for complete search history.

(56) References Cited

U.S. PATENT DOCUMENTS

| | | | | |
|---|---|---|---|---|
| 5,259,729 A * | 11/1993 | Fujihira | ................. | A63H 27/12 416/131 |
| 5,350,984 A * | 9/1994 | Carobolante | ............. | H02P 6/20 318/139 |
| 6,995,530 B2 * | 2/2006 | Biamonte | ............... | H02P 6/185 318/400.33 |
| 7,026,773 B2 * | 4/2006 | Petersen | ................ | H02K 21/12 318/400.01 |
| 7,145,308 B1 * | 12/2006 | Chase | .................... | H02K 7/088 310/268 |
| 7,202,623 B2 * | 4/2007 | Zhou | ........................ | H02P 6/22 318/400.11 |
| 7,793,606 B2 * | 9/2010 | Olivier | ................. | G01V 1/3826 114/245 |
| 7,816,635 B2 * | 10/2010 | Fink | .......................... | B64C 3/56 102/490 |
| 8,089,034 B2 * | 1/2012 | Hammerquist | ........... | B64C 3/56 244/3.27 |
| 8,378,602 B2 | 2/2013 | Kern et al. | | |
| 8,587,232 B2 | 11/2013 | Kern et al. | | |
| 9,187,175 B1 * | 11/2015 | Chen | ........................ | B64D 1/22 |
| 9,586,673 B2 * | 3/2017 | Firanski | ................... | B64C 11/02 |
| 2001/0048278 A1 * | 12/2001 | Young | ...................... | H02P 6/085 318/400.29 |
| 2004/0061467 A1 * | 4/2004 | Liu | ............................. | H02P 6/20 318/463 |
| 2004/0232864 A1 * | 11/2004 | Sunaga | ...................... | H02P 7/29 318/434 |
| 2006/0125439 A1 * | 6/2006 | Ajima | ....................... | B60K 6/26 318/716 |
| 2006/0186749 A1 * | 8/2006 | Strydom | ................. | H02K 53/00 310/103 |
| 2006/0284581 A1 * | 12/2006 | Mullin | ...................... | H02P 3/08 318/362 |
| 2007/0152098 A1 * | 7/2007 | Sheahan, Jr. | ............. | B64C 3/56 244/49 |
| 2010/0026994 A1 * | 2/2010 | Bove | ......................... | G01D 5/26 356/138 |
| 2011/0115419 A1 * | 5/2011 | Kern | ......................... | H02P 6/24 318/400.09 |
| 2011/0115421 A1 * | 5/2011 | Kern | ......................... | H02P 6/20 318/400.11 |
| 2011/0197703 A1 * | 8/2011 | Badre-Alam | ......... | B64C 11/008 74/574.1 |
| 2011/0291597 A1 * | 12/2011 | Kern | ......................... | H02P 6/20 318/400.11 |
| 2012/0007526 A1 * | 1/2012 | Tsai | .......................... | H02P 7/29 318/3 |
| 2012/0224951 A1 * | 9/2012 | Degner | ................. | F04D 25/062 415/174.1 |
| 2013/0134913 A1 | 5/2013 | Kern et al. | | |
| 2016/0229549 A1 * | 8/2016 | Mitrovic | ................. | B64C 11/44 |
| 2017/0137142 A1 * | 5/2017 | Firanski | .................. | B64D 31/06 |
| 2017/0166304 A1 | 6/2017 | Erdozain, Jr. et al. | | |

OTHER PUBLICATIONS

PCT/US2016/065442, "International Search Report and Written Opinion", dated Apr. 19, 2017, 12 pages.

* cited by examiner

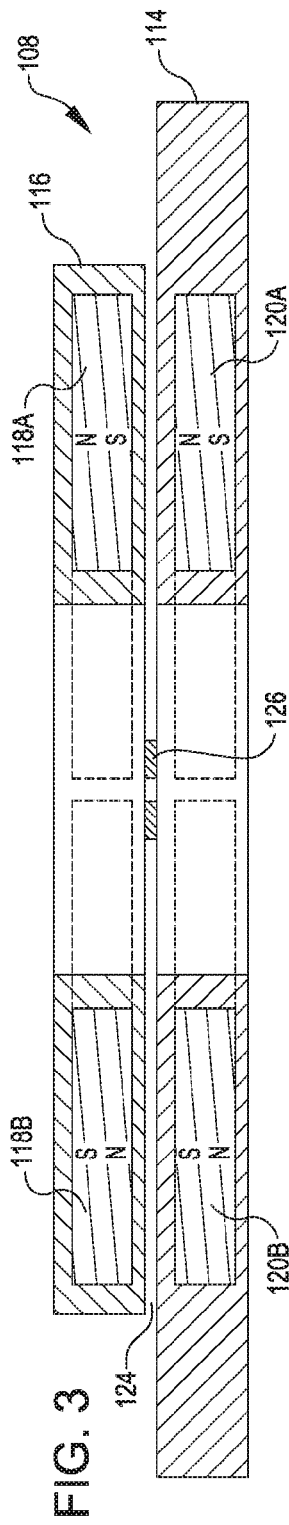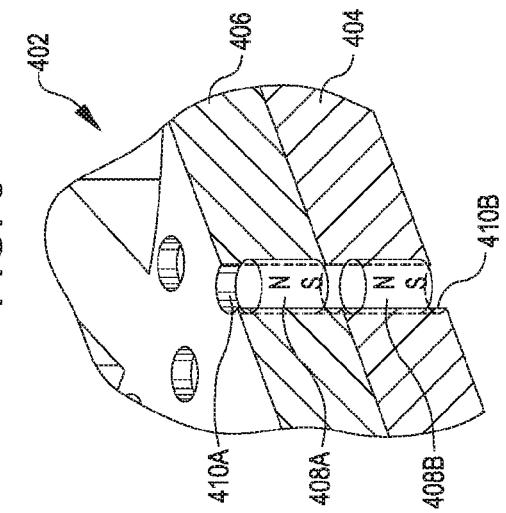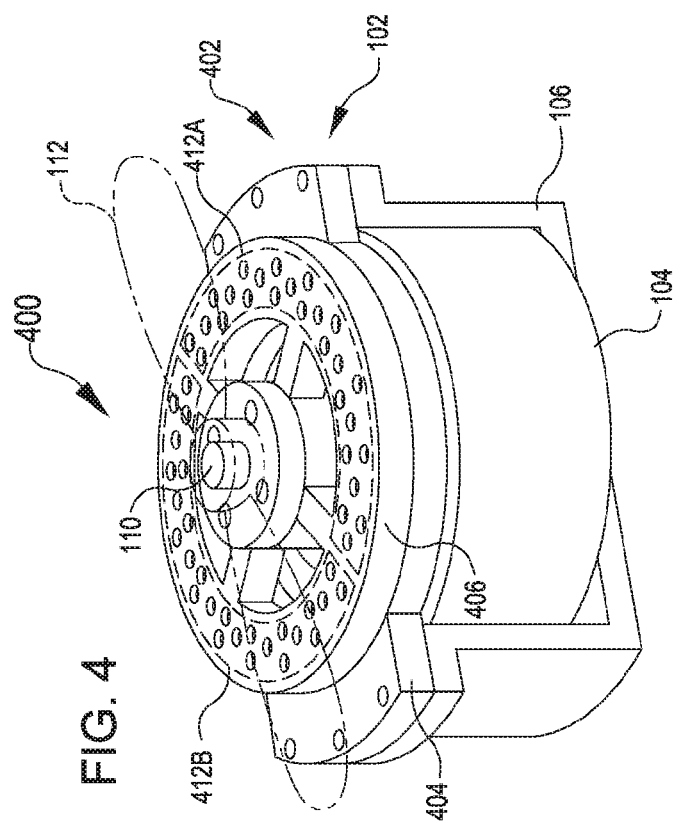

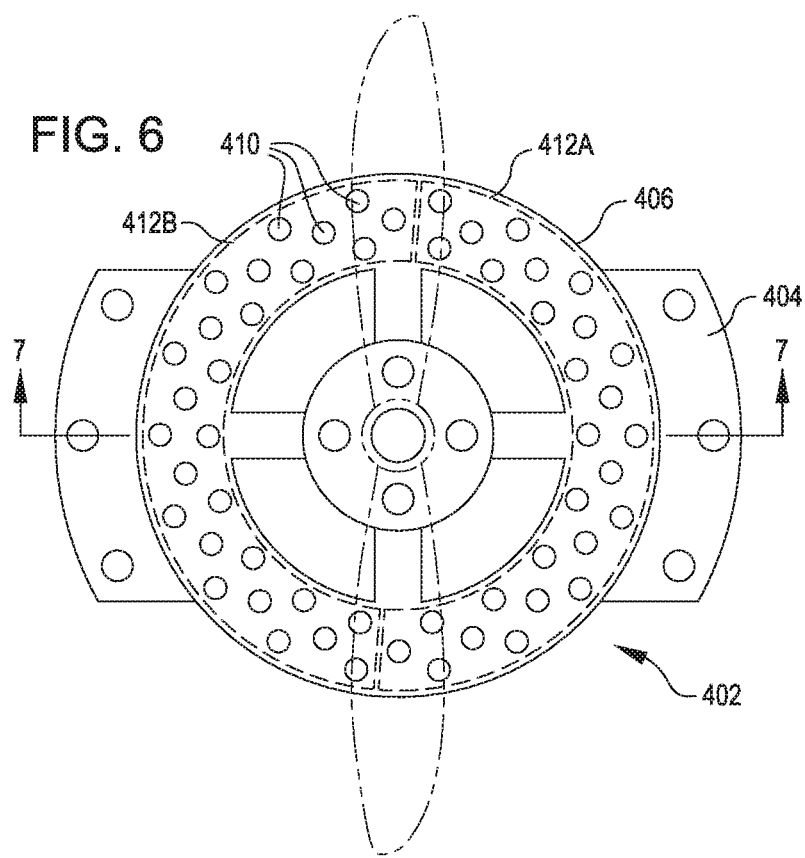

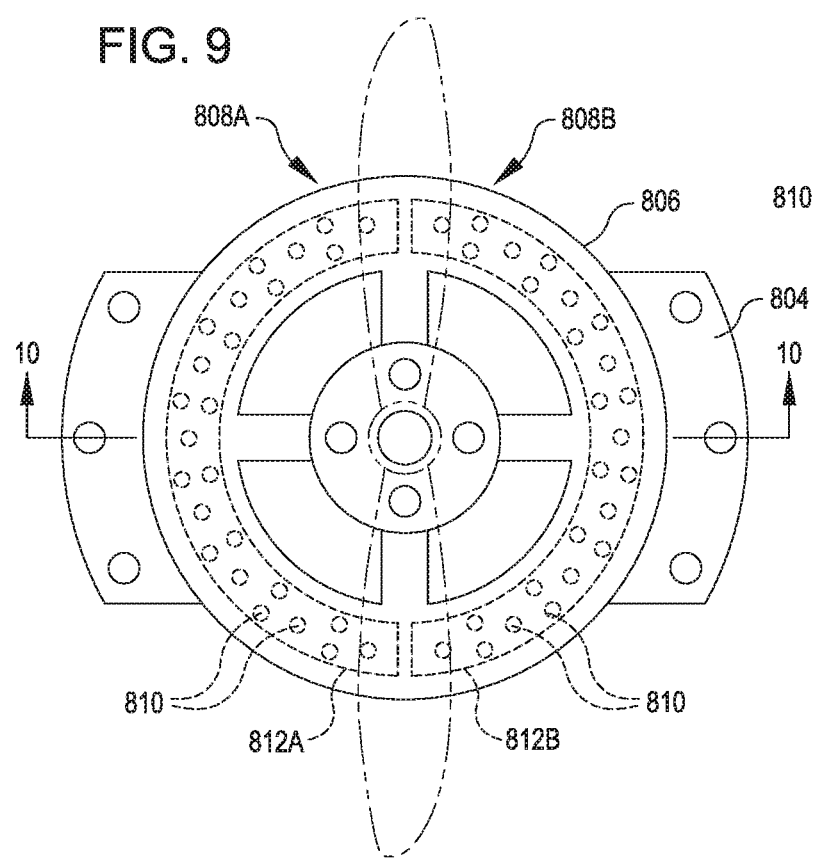

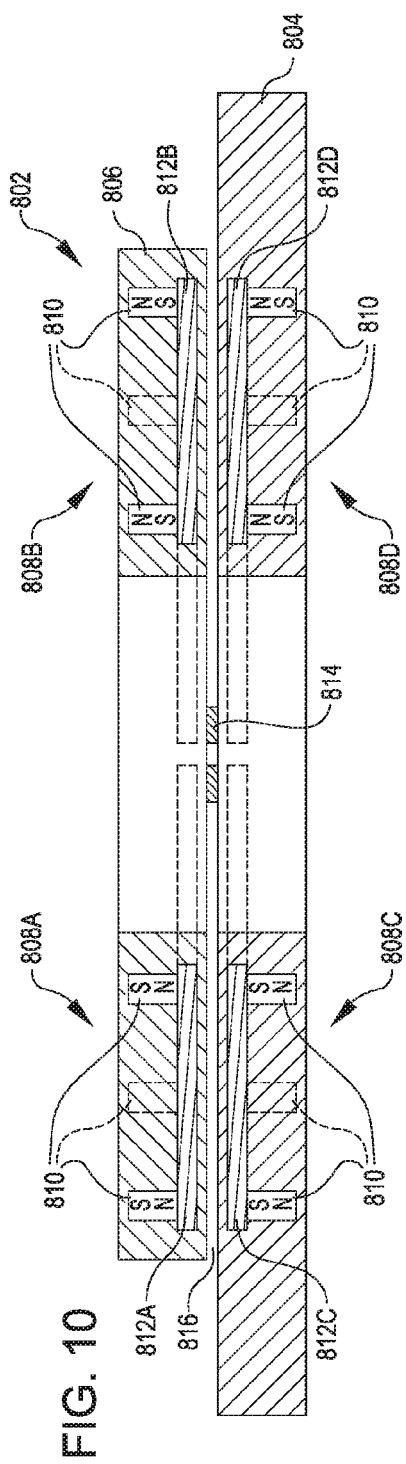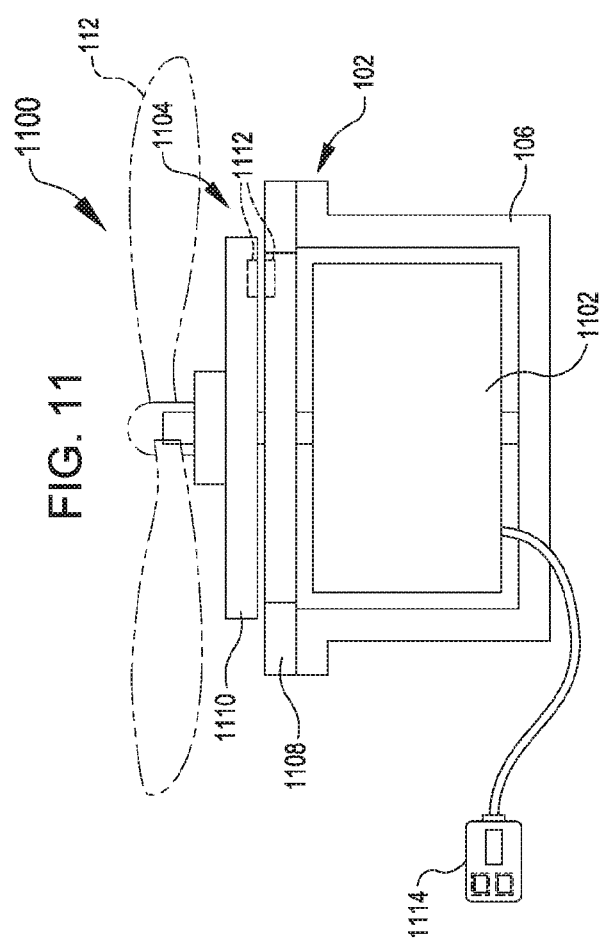

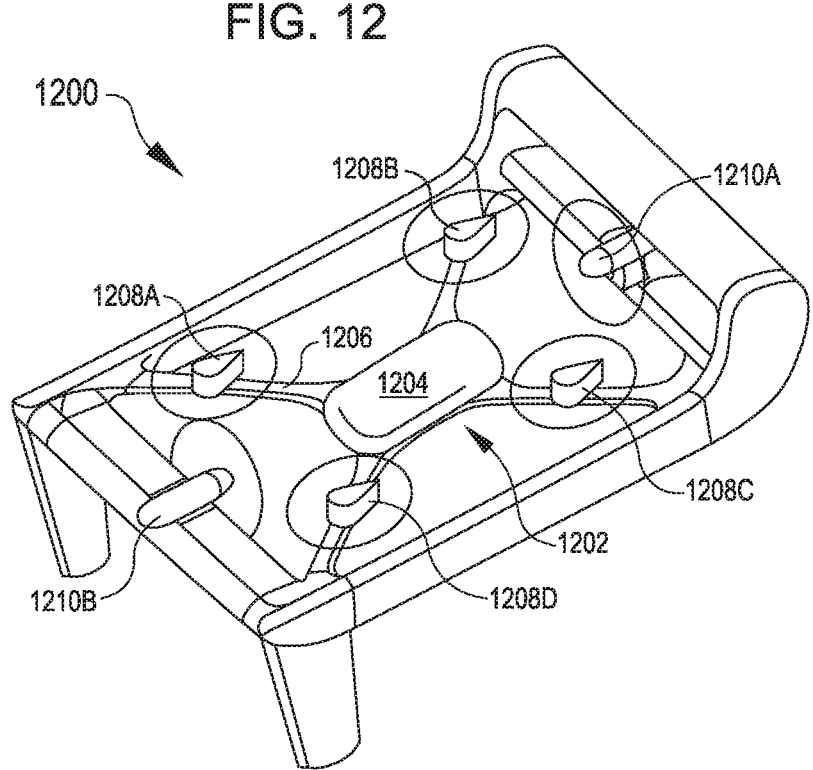

PROPELLER ALIGNMENT DEVICES

CROSS-REFERENCES TO RELATED APPLICATIONS

The present application claims the benefit of U.S. Non-Provisional application Ser. No. 14/967,070 entitled, "PROPELLER ALIGNMENT DEVICES," filed Dec. 11, 2015, the full disclosure of which is incorporated herein by reference in its entirety for all purposes.

BACKGROUND

An aerial vehicle such as an unmanned aerial vehicle may include multiple independently-controllable propellers disposed about the aerial vehicle. Some of the propellers may be aligned to provide thrust, while others may be aligned to provide lift. When certain propellers are not under power, they may free spine or otherwise create aerodynamic drag.

BRIEF DESCRIPTION OF THE DRAWINGS

Various embodiments in accordance with the present disclosure will be described with reference to the drawings, in which:

FIG. 3 illustrates a profile view of the alignment structure from FIG. 2, in accordance with at least one example;

FIG. 4 illustrates a perspective view of a motor system including an alignment structure, in accordance with at least one example;

FIG. 5 illustrates a cut-away view of the alignment structure from FIG. 4, in accordance with at least one example;

FIG. 6 illustrates a top view of the alignment structure from FIG. 4, in accordance with at least one example;

FIG. 9 illustrates a top view of the alignment structure from FIG. 8, in accordance with at least one example;

FIG. 10 illustrates a profile view of the alignment structure from FIG. 9, in accordance with at least one example;

FIG. 11 illustrates a profile view of a motor system, in accordance with at least one example; and FIG. 12 illustrates an example unmanned aerial vehicle that may include one or more motor systems as described herein, in accordance with at least one example.

DETAILED DESCRIPTION

Figure 1:
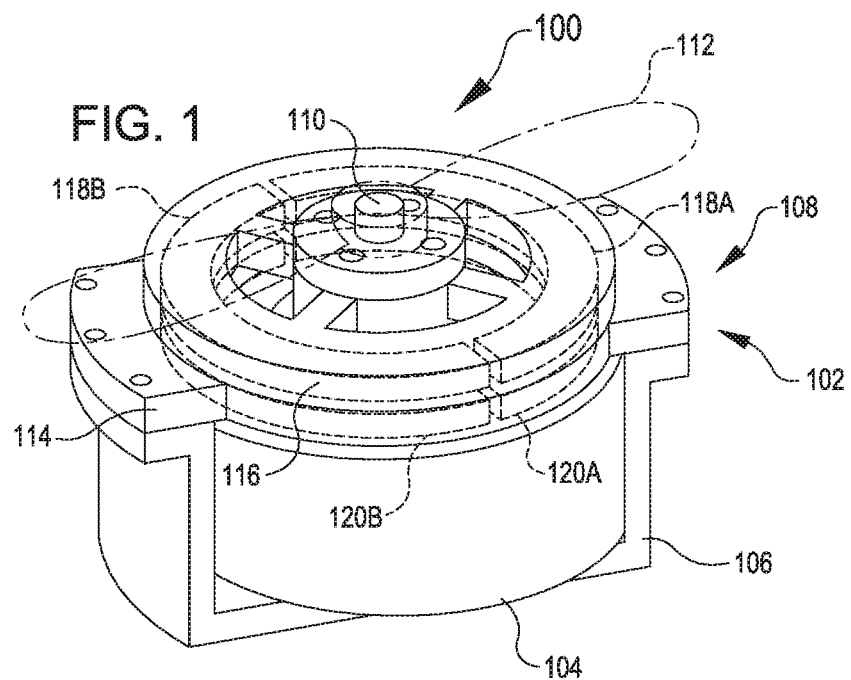
FIG. 1 illustrates a perspective view of a motor system including an alignment structure, in accordance with at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Examples of the present specification are directed to, among other things, propeller alignment devices for use with propellers in aerial vehicles, which can include unmanned aerial vehicles. An example propeller alignment device described herein may be configured to automatically align and hold a propeller in a set orientation when the propeller is not in use. Such an alignment may be achieved passively by using one or more magnets included in the propeller alignment device. Aligning the propeller in the set orientation may be desirable to reduce airflow drag on the propeller. For example, certain aerial vehicles may include a first motor assembly including a first propeller configured to provide vertical lift and a second motor assembly including a second propeller to provide horizontal thrust. When these aerial vehicles are flying horizontally, the first motor assembly may be turned off. When the first motor assembly includes a propeller alignment device as described herein, the first propeller can be rotated to and held in a set orientation. This orientation can be predetermined to minimize airflow drag exerted on the first propeller as the aerial vehicle flies. For example, if the first propeller is a dual-blade propeller, the set orientation may align the dual-blade propeller with the direction of airflow.

Turning now to a particular example, in this example, a propeller alignment device is provided. The propeller alignment device may be included in an aerial vehicle such as an unmanned aerial vehicle (UAV). To this end, the propeller alignment device may include an alignment structure that causes the propeller to rotate to a predetermined orientation when current is not being applied to rotate the propeller. The predetermined orientation can be predetermined to position the propeller at a position relative to the alignment structure that minimizes airflow drag on the propeller. In this manner, the predetermined orientation may align the propeller with the airflow. To cause the propeller to rotate to the predetermined orientation and to be held in the predetermined orientation, the propeller alignment device can include a set of magnets included in two opposing retainers. The set of magnets together may form a magnetic circuit that creates a magnetic force that causes the propeller to rotate to the predetermined orientation. This magnetic force may be a function of a repelling force and an attracting force created by the set of magnets. Once in the predetermined orientation, the magnetic force resists further rotation of the propeller, thereby functioning to hold the propeller in the predetermined orientation. The two opposing retainers can include a stationary retainer and a rotating retainer. The stationary retainer may be attached to the motor and/or a frame of the aerial vehicle and may include two oppositely-oriented magnets in each of two halves of the stationary retainer. Similarly, the rotating retainer may be configured to rotate with the propeller and may include two oppositely-oriented magnets in each of two halves of the stationary retainer. The stationary retainer can be aligned with rotating retainer such that respective oppositely-oriented magnets alternatingly align with each other as the rotating retainer rotates relative to the stationary retainer. The predetermined orientation can include an alignment of the set of magnets that has a lowest magnetic energy state.

Turning now to the figures, FIG. 1 illustrates an example motor system 100 in accordance with at least one example. The motor system 100 may include a propeller alignment device 102 and a motor 104. The propeller alignment device 102 may include a mounting housing 106 and an alignment structure 108. The mounting housing 106 may be configured to attach the propeller alignment device 102 and the motor 104 to a frame of an aerial vehicle. To this end, the motor 104 may be connected to the mounting housing 106 in any suitable manner. As the motor 104 may be any suitable motor such as an electrical inrunner or outrunner type motors, the mounting housing 106 can be configured to appropriately connect to the motor 104 depending motor type. As used herein, the term "outrunner" refers to a type of motor where the outer shell (i.e., the rotor) is spun around the windings (i.e., the stator). In contrast, "inrunner" motors have a rotational core (i.e., the rotor) that is contained within the non-rotating outer shell (i.e., the stator). In the example illustrated in FIG. 1, the motor 104 is an example of an outrunner type motor. Thus, the mounting housing 106 may be connected to the motor 104 via a drive shaft 110 that extends through the motor 104. A rotational axis may extend through a midpoint of the drive shaft 110 and through the alignment structure 108.

The alignment structure 108 may be configured to align a propeller 112 relative to the mounting housing 106, relative to the aerial vehicle, or relative to any other component of the propeller alignment device 102. The alignment structure 108 may include a first retainer 114 and a second retainer 116. In some examples, the first retainer 114 and/or the second retainer 116 may have circular (e.g., ring shaped), non-circular shapes (e.g., square shaped), or other shapes, which may not include openings as illustrated. In some examples, the first retainer 114 may be coupled to the motor 104 via a stator of the motor 104. In this manner, the first retainer 114 may be considered a stationary retainer as it remains stationary with the stator as a rotor of the motor 104 rotates. The second retainer 116 may be spaced apart from the first retainer 114 and may be coupled to the rotor of the motor 104. In this manner, the second retainer 116 may be considered a rotating retainer as it rotates with the stator as the stator rotates.

Together the first retainer 114 and the second retainer 116 may function to align the propeller 112 in a predetermined orientation with respect to the propeller alignment device 102. The propeller 112 may be any suitable propeller including one or more blades. In some examples, the propeller 112 is a dual-blade propeller that, when aligned in the predetermined orientation, is substantially parallel to a direction of airflow such that airflow drag on the dual-blade propeller is minimized.

Figure 2:
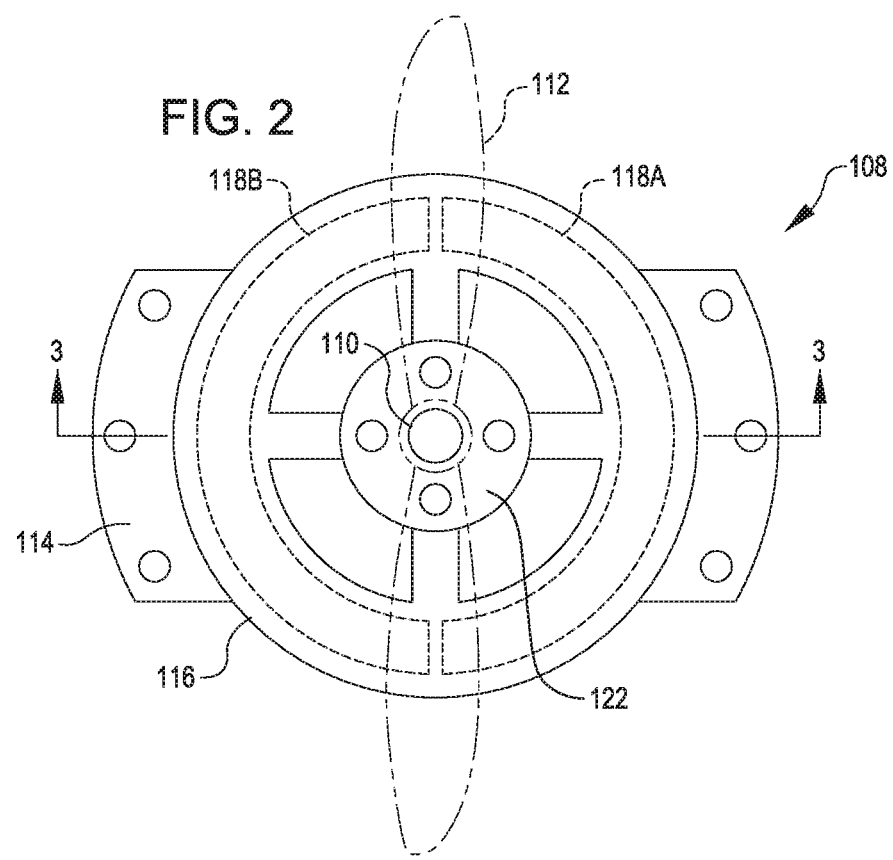
FIG. 2 illustrates a top view of the alignment structure from FIG. 1, in accordance with at least one example.

As illustrated in FIG. 2, the propeller 112 may be attached to the motor 104 via the drive shaft 110 and a mounting surface 122 of the second retainer 116. In this manner, the orientation of the propeller 112 may depend on the orientation of the second retainer 116. The second retainer 116 may be substantially aligned with the first retainer 114 along the drive shaft 110. The first retainer 114 may be attached to the mounting housing 106 such that the first retainer 114 remains fixed as the second retainer 116 (and the propeller 112) rotate. In some examples, the first retainer 114 may be attached to the motor 104. For example, when the motor 104 is an inrunner type motor, the first retainer 114 may be attached to a casing of the motor 104 and/or the stator of the motor 104. Thus, in some examples, the mounting housing 106 may not be included in the motor system 100, and/or may function to attach the motor 104 to a frame of an aerial vehicle.

As introduced previously, the alignment structure 108 may function to align the propeller 112 in a predetermined orientation. To do so, in some examples, the first retainer 114 and the second retainer 116 may each include at least two magnets disposed in opposite semicircular halves of the first retainer 114 and the second retainer 116. For example, the second retainer 116 may include a first set of magnets 118A and 118B disposed in opposite halves of the second retainer 116. The first retainer 114 may include a second set of magnets 120A and 120B disposed in opposite halves of the first retainer 114. The opposite semicircular halves may be c-shaped and curve towards each other. As used herein, the first set of magnets 118A and 118B may be considered rotor magnets as these magnets may be included in the second retainer 116 that can be coupled to the rotor of the motor 104. Likewise, the second set of magnets 120A and 120B may be considered stator magnets as these magnets may be included in the first retainer 114 that can be coupled to the stator of the motor 104.

In some examples, each of the magnets 118A and 118B may be oppositely orientated. In particular, in the view illustrated in FIG. 1 and moving from the top down, a magnetic orientation of the magnet 118A may be N-S and a magnetic orientation of the magnet 118B may be S-N. Similarly, each of the magnets 120A and 120B may be oppositely orientated such that a magnetic orientation of the magnet 120A may be N-S and a magnetic orientation of the magnet 120B may be S-N. A more detailed discussion of example magnetic orientations is provided in FIG. 3.

The first set of magnets 118A and 118B and the second set of magnets 120A and 120B may magnetically bias the second retainer 116 (and the propeller 120 and the rotor) into a predetermined orientation. For example, based on the orientation of the magnets 118A, 118B and the magnets 120A, 120B, a magnetic force will be produced that causes the second retainer 116 to rotate to a fixed position and remain in that fixed position, depending on the positions of the magnets 118A, 118B relative to the magnets 120A, 120B. In some examples, the location of the two sets of magnets may be selected to correspond to a desired orientation of the propeller 112. For example, the propeller 112 may be oriented to align with the direction of travel of an aerial vehicle in which the motor system 100 is included. This orientation may be desirable in order to reduce drag on the propeller 112 when the motor 104 is turned off (e.g., when the aerial vehicle is gliding or being propelled by other motors). For example, in an aerial vehicle that includes lift propellers and thrust propellers, the motor system 100 may be implemented on at least the lift propellers. After the lift propellers have lifted the aerial vehicle, motors to each may be turned off. Using propeller alignment devices such as the propeller alignment device 102, each lift propeller may automatically be oriented to their predetermined orientations. In some examples, these orientations may substantially align with a direction of travel of the aerial vehicle as propelled by the thrust propellers.

In some examples, the predetermined orientation may correspond to features of the aerial vehicle. For example, the predetermined orientation may be selected to "hide" the propeller 112 behind a portion of the aerial vehicle. In this manner, the airflow drag attributable to the propeller 112 may be minimized.

Magnetic field strength of the two sets of magnets (i.e., 118A, 118B, and 120A, 120B) may be selected to correspond to a desired magnetic force for rotating the propeller 112 to the predetermined orientation and for retaining the propeller 112 in the predetermined orientation. For example, continuing with the example from above, the desired magnetic force may be capable of withstanding a rotational moment applied to the lift propeller when its motor is turned off and the aerial vehicle is moving forward. In some examples, the desired magnetic force may be capable of withstanding forces applied to the propeller 112 even when the airflow over the propeller is not parallel to the orientation of the propeller 112. For example, such non-parallel airflow may be present when the aerial vehicle is climbing, diving, pitching, yawing, performing side-to-side movements, or any other varieties of movement.

In some examples, the predetermined orientation of the propeller 112 corresponds to an orientation in which the magnets 118A and 120A are substantially aligned and the magnets 118B and 120B are also substantially aligned as illustrated in FIG. 1. As the second retainer 116 rotates relative to the first retainer 114, the first set of magnets 118A, 118B may alternatingly rotate with respect to the second set of magnets 120A, 120B. This alternating rotation may take place while the motor 104 rotates the second retainer 116 and/or when a different rotational force is applied to the propeller 112 and/or the second retainer 116. The motor 104 may have sufficient torque to overcome the magnetic force created between the second retainer 116 and the first retainer 114 by the magnets 118A, 118B, 120A, and 120B. However, once power to the motor 104 is turned off, the rate of rotation of the second retainer 116 may decrease until the second retainer 116 stops at a natural resting orientation, which may also be the predetermined orientation. In some examples, the natural resting orientation may be considered "natural" because it is the orientation in which the magnets 118A, 118B, 120A, and 120B naturally want to be in based on their magnetic orientations. In some examples, in the natural orientation, the magnets 118A, 118B, 120A, and 120B create a magnetic circuit between the second retainer 116 and the first retainer 114. In some examples, in the natural orientation, the magnets 118A, 118B, 120A, and 120B are at their lowest energy states compared to other orientations.

As introduced above, FIG. 3 illustrates a profile view of the alignment structure 108. The second retainer 116 may be aligned with and spaced apart from the first retainer 114. For example, the second retainer 116 may be spaced apart from the first retainer 114 such that an air gap 124 is formed between a bottom surface of the second retainer 116 and a top surface of the first retainer 114. A spacer 126 may function to hold the second retainer 116 spaced apart from the first retainer 114. In some examples, the second retainer 116 and the first retainer 114 are in physical contact. The strength of the magnetic force may increase as the distance between the second retainer 116 and the first retainer 114 decreases.

In the profile view of FIG. 3, the magnets 118A and 118B of the second retainer 116 are aligned with the corresponding magnets 120A and 120B of the first retainer 114. Because the magnets 118A, 118B, 120A, and 120B are aligned, the alignment structure 108 in FIG. 3 can be considered to be in the predetermined orientation or natural orientation. Because the magnetic orientation of the magnet 118A is opposite that of the magnet 120A, the N pole of the magnet 120A may be attracted to the S pole of the magnet 118A. For similar reasons, the N pole of the magnet 118B may be attracted to the S pole of the magnet 120B. Any rotation of the second retainer 116 will be resisted by the attraction between the magnets 118A and 120A and 118B and 120B. On the other hand, when the second retainer 116 is rotated 180 degrees, the N poles of the magnets 120A and 118B will be aligned and S poles of the magnets 120B and 118A will be aligned. This alignment will create a magnetic repulsive force that will want to push the second retainer 116 away from the first retainer 114. Given that the second retainer 116 is retained on the drive shaft 110 (i.e., cannot translate away from the first retainer 114) and the first retainer 114 is fixed, the repulsive force will be manifested as a rotational force that causes the second retainer 116 to rotate.

FIG. 4 illustrates an example motor system 400 in accordance with at least one example. Like the motor system 100, the motor system 400 may include the propeller alignment device 102 and the motor 104. The propeller alignment device 102 may include the mounting housing 106 and an alignment structure 402. The alignment structure 402 is an example of the alignment structure 108. In the motor system 400, the alignment structure 402 may include a first retainer 404 and a second retainer 406. The first retainer 404 and the second retainer 406 are examples of the first retainer 114 and the second retainer 116.

Each of the first retainer 404 and the second retainer 406 may include a plurality of magnets 408 disposed within a plurality of openings 408 formed within the first retainer 404 and the second retainer 406. In some examples, the number and location of openings 410 in the first retainer 404 correspond to the number and location of openings 410 in the second retainer 406. As illustrated in FIG. 6 for illustrative purposes, each of the first retainer 404 and the second retainer 406 may be divided into two semi-circular halves, as illustrated with reference to the second retainer 406 as a first area 412A and a second area 412B. The magnets 408 may be magnetically oriented oppositely between the first area 412A and the second area 412B of the second retainer 406 and within corresponding areas of the first retainer 404. In particular, in the view illustrated in FIG. 6 and moving from the top down, the magnets 408 within the first area 412A may be magnetically-oriented N-S, while the magnets 408 within the second area 412B may be magnetically-oriented S-N. Similarly, the magnets 408 within the corresponding areas of the first retainer 404 may be oppositely orientated. In this manner, the magnets 408 within the first area 412A may effectively function as a first magnet with N-S orientation. Likewise the magnets 408 within the second area 412B may effectively function as a second magnet with an S-N orientation. In some examples, the magnets 408 that are included in the second retainer 406 may be considered rotor magnets, while the magnets 408 that are included in the first retainer 404 may be considered stator magnets. A more detailed discussion of example magnetic orientations is provided in FIG. 7. The magnets 408 may enable the alignment structure 402 to function similarly to the alignment structure 108. In particular, the alignment structure 402 may be used to align the propeller 112 in a predetermined orientation.

FIG. 5 illustrates a cut-away view of a portion of the alignment structure 402. A magnet 408A is shown in an opening 410A of the second retainer 406. A magnet 408B is shown in an opening 410B in the first retainer 404. The magnet 408A and the magnet 408B may be considered a set of magnets that align with each other when the second retainer 406 is in the predetermined orientation. For example, the rotor magnets including the magnet 408A may be intermixed in the second retainer 406 such that orientations of the rotor magnets 408A are varied with respect to each other throughout the entirety of the second retainer 406. Similarly, the stator magnets including the magnet 408B may be intermixed in the first retainer 404 such that orientations of the stator magnets 408B are varied with respect to each other throughout the entirety of the first retainer 404. In some examples, the openings 410 extend through the first retainer 404 and the second retainer 406. The magnets 408 may be pressed into the openings 410 or otherwise held within the openings 410. In some examples, the magnets 408 may have a circular cross section and columnar shape. The openings 410 may have a corresponding circular cross section. In some examples, the magnets 408 and the openings 410 may have any suitable non-circular cross sections. For example, the cross sections may be square, trapezoidal, or without a definable shape.

Figure 7:
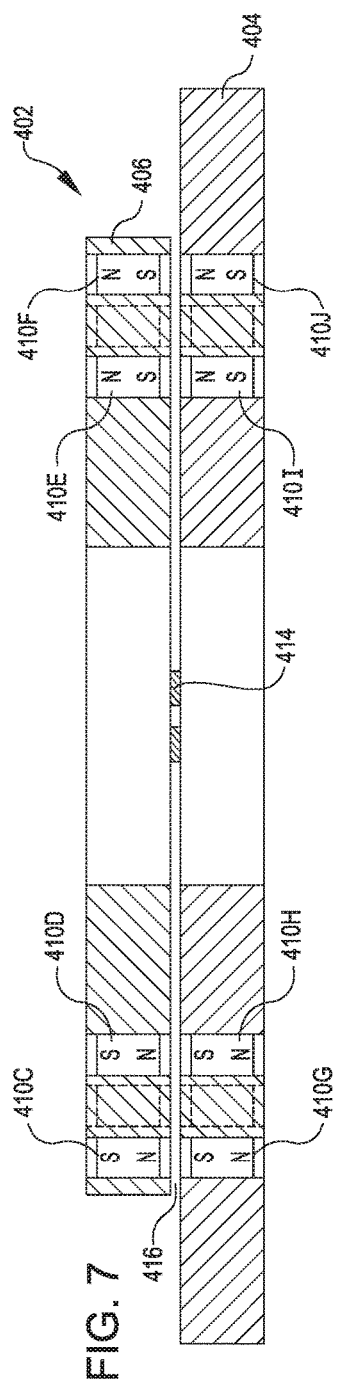
FIG. 7 illustrates a profile view of the alignment structure from FIG. 6, in accordance with at least one example.

As introduced above, FIG. 7 illustrates a profile view of the alignment structure 402. As discussed herein, the second retainer 406 may be aligned with and spaced apart from the first retainer 404. For example, the second retainer 406 may be spaced apart from the first retainer 404 such that an air gap 416 is formed between a bottom surface of the second retainer 406 and a top surface of the first retainer 404. A spacer 414 may function to hold the second retainer 406 spaced apart from the first retainer 404. In some examples, the second retainer 406 and the first retainer 404 are in physical contact. The strength of the magnetic force may increase as the distance between the second retainer 406 and the first retainer 404 decreases.

The profile view of FIG. 7 illustrates magnets 410C-410F disposed in the second retainer 406 and corresponding magnets 410G-410J disposed in the first retainer 404. Like the alignment structure 108 discussed with reference to FIG. 3, the magnets 410C and 410D may be orientated similar to the magnets 410G and 410H. Likewise the magnets 410C and 410D may be orientated similar to the magnets 410I and 410J, with the orientations of 410E, 410F, 410I, and 410J being opposite the orientations of 410C, 410D, 410G, and 410H. Other magnets in the respective halves of the second retainer 406 and the first retainer 404 may have similar orientations. Thus, the magnets 408 may operate to create a magnetic force to rotate the second retainer 406 and retain the second retainer 406 as described herein.

Figure 8:
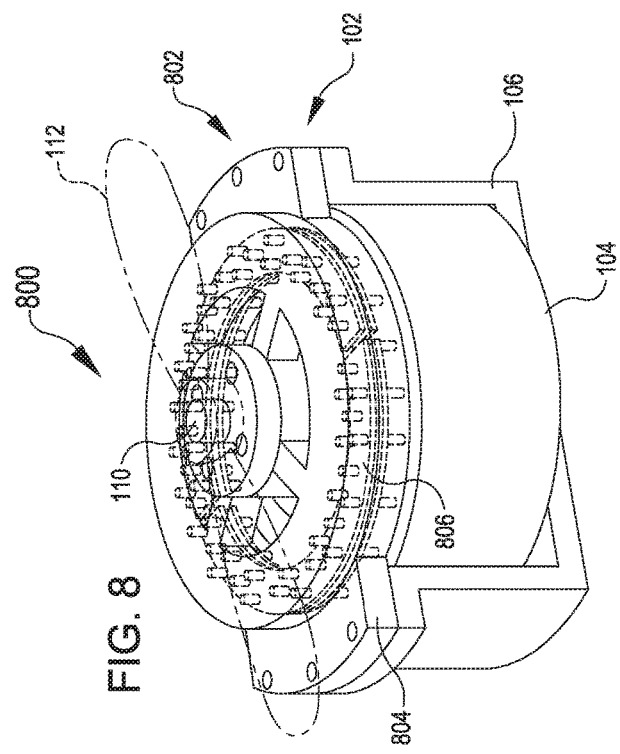
FIG. 8 illustrates a perspective view of a motor system including an alignment structure, in accordance with at least one example.

FIG. 8 illustrates an example motor system 800 in accordance with at least one example. Like the motor systems 100 and 400, the motor system 800 may include the propeller alignment device 102 and the motor 104. In this example, the propeller alignment device 102 may include the mounting housing 106 and an alignment structure 802. The alignment structure 802 is an example of the alignment structures 108 and 402. In the motor system 800, the alignment structure 802 may include a first retainer 804 and a second retainer 806. The first retainer 804 is an example of the first retainer 114 and the second retainer 806 is an example of the second retainers 116 and 406.

Each of the second retainer 806 and the first retainer 804 may include at least two magnetic assemblies 808. In some examples, more than two magnetic assemblies 808 are included in each of the second retainer 806 and first retainer 804. For example, four magnetic assemblies, eight magnetic assemblies, or more magnetic assemblies may be included depending on the embodiment. In some examples, the magnetic assemblies 808 may be disposed entirely within the second retainer 806 and the first retainer 804. For example, the second retainer 806 and the first retainer 804 may be formed around the magnetic assemblies 808.

Each magnetic assembly 808 may include one or more magnets 810 attached to a ferromagnetic plate 812. In some examples, all of the magnets 810 on a particular ferromagnetic plate 812 may have the same magnetic orientation (i.e., N-S or S-N). This may cause the magnetic assembly 808 to become magnetized and function as a single magnet with a magnetic orientation that corresponds to the magnetic orientation of the magnets 810. The magnets 810 may have any suitable size and cross section. In some examples, the magnets 810 include thin pieces of magnetic material. The magnets 810 may enable the alignment structure 802 to function similarly to the alignment structures 108 and 402. In particular, the alignment structure 802 may be used to align the propeller 112 in a predetermined orientation.

FIG. 9 illustrates a top view of the alignment structure 802. In this view, a first magnetic assembly 808A and a second magnetic assembly 808B are illustrated. The first magnetic assembly 808A may include a plurality of magnets 810 attached to a ferromagnetic plate 812A, which may cause the first magnetic assembly 808A to function as a magnet. Likewise, the second magnetic assembly 808B may include a plurality magnets 810 attached to a ferromagnetic plate 812B, which may cause the second magnetic assembly to function as a magnet.

FIG. 10 illustrates a profile view of the alignment structure 802. As discussed herein, the second retainer 806 may be aligned with and spaced apart from the first retainer 804. For example, the second retainer 806 may be spaced apart from the first retainer 804 such that an air gap 816 is formed between a bottom surface of the second retainer 806 and a top surface of the first retainer 804. A spacer 814 may function to hold the second retainer 806 spaced apart from the first retainer 804. In some examples, the second retainer 806 and the first retainer 804 are in physical contact. The strength of the magnetic force may increase as the distance between the second retainer 806 and the first retainer 804 decreases.

The profile view of FIG. 10 illustrates the first and second magnetic assemblies 808A and 808B disposed within the second retainer 806. The profile view also illustrates third and fourth magnetic assemblies 808C and 808D disposed within the first retainer 804. As described herein, each of the magnetic assemblies 808A and 808B may include ferromagnetic plates 812A and 812B disposed within the second retainer 806 adjacent a bottom surface that is nearer a top surface of the first retainer 804. Likewise, each of the magnetic assemblies 808C and 808D may include ferromagnetic plates 812C and 812D disposed within the first retainer adjacent the top surface that is nearer the bottom surface of the second retainer 806. In some examples, each magnetic assembly 808A-808D may also include a second ferromagnetic plate as a mirror of the illustrated ferromagnetic plates 812A-812D. Thus, these other ferromagnetic plates may be disposed within the first retainer 804 and the second retainer 806 at locations above and below the magnets 810. For example, with respect to the first retainer 804, first other ferromagnetic plates may be placed nearer a bottom surface of the first retainer 804. With respect to the second retainer 806, second other ferromagnetic plates may be placed nearer a top surface of the second retainer 806. In this manner, the magnets 810 may be sandwiched between the other ferromagnetic plates and the illustrated ferromagnetic plates 812A-812D. This may function to more equally distribute the magnetic force.

The magnetic assembly 808A may also include one or more magnets 810 extending from the ferromagnetic plate 812A towards a top surface of the second retainer 806 and orientated S-N. The magnetic assembly 808B may also include one or more magnets 810 extending from the ferromagnetic plate 812B towards the top surface of the second retainer 806 and orientated N-S. The magnetic assembly 808C may also include one or more magnets 810 extending from the ferromagnetic plate 812C towards a bottom surface of the first retainer 804 and orientated S-N. The magnetic assembly 808D may also include one or more magnets 810 extending from the ferromagnetic plate 812D towards the bottom surface of the first retainer 804 and orientated N-S. In this manner, the alignment structure 802 may be configured to implement the techniques described herein related to propeller alignment.

FIG. 11 illustrates an example motor system 1100 in accordance with at least one example. Like the motor systems 100, 400, and 800, the motor system 1100 may include the propeller alignment device 102 and a motor 1102. In this example, the propeller alignment device 102 may include the mounting housing 106 and an alignment structure 1104. The alignment structure 1104 is an example of the alignment structures 108, 402, and 802. Thus, the alignment structure 1104 may include a first retainer 1108 and a second retainer 1110 configured with any suitable combination of magnets in order to passively align the propeller 112 in a predetermined orientation. In some examples, the alignment structure 1104 may not include any magnets.

In either example, however, the motor system 1100 may include a sensor package 1112 and a management device 1114. The sensor package 1112 may be any suitable combination of any suitable sensors (including a single sensor) capable of detected position of the propeller 112 with respect to the propeller alignment device 102 or any other aspect of an aerial vehicle in which the motor system 1100 is attached. In some examples, the sensor package 1112 is capable of detecting position of the second retainer 1110 with respect to the first retainer 1108. In some examples, the sensor package 1112 makes a binary detection of whether the propeller 112 is "aligned" (e.g., in the predetermined orientation) or "not aligned" (e.g., outside of the predetermined orientation). In some examples, the sensor package 1112 may be configured to detect the position of the propeller 112 at a greater level of granularity. For example, the sensor package 1112 may be configured to detect not only when the propeller 112 is aligned or not aligned, but the degree to which the propeller 112 is out of alignment.

The management device 1114 may be configured to manage the local operation of the motor 1102. To this end, the management device 1114 may include one or more processors (including any suitable combination of microprocessors, integrated circuits, and the like) capable of processing instructions to generate an output for the motor 1102. For example, the management device 1114 may receive instructions from a global management device indicating how the motor 1102 is to be operated. In some examples, the management device 1114 may receive these instructions and may make one or more computations (using the one or more processors) to determine a current to be provided to the motor 1102.

The management device 1114 may also be configured to receive sensing information captured by the sensor package 1112. The management device 1114 may use the sensing information to determine how to operate the motor 1102 to rotate the propeller 112 into the predetermined orientation and how to retain the propeller 112 in the predetermined orientation without instruction from the global management device. Such operation may include how much current to apply to the motor 1102. In some examples, the sensor package 1112 may periodically or continuously provide the sensing information to the management device 1114. With the sensing information, the management device 1114 may continuously or periodically adjust the current being provided to the motor 1102. In some examples, the management device 1114 operates the motor 1102 such that it rotates a small amount and stops (i.e., is "stepped" around). Once the sensor package 1112 detects that the propeller is aligned, the motor 1102 can cease stepping.

Components of the alignment structures 108, 402, 802, and 1104 may be formed of any suitable rigid material (e.g., aluminum, plastic, titanium, composites, and any other suitable material). Any of the magnets described herein may be configured to be electromagnets such that they produce a magnetic force when electricity is applied.

FIG. 12 illustrates an example unmanned aerial vehicle (UAV) 1200 that may include propeller alignment devices as described herein. It is understood, however, that the propeller alignment devices described herein may also be implemented in aerial vehicles that are not unmanned. The UAV 1200 may be designed in accordance with commercial aviation standards and may include multiple redundancies to ensure reliability. For purposes of this specification, the UAV 1200 may include a plurality of systems or subsystems operating under the control of, or at least partly under the control of, a management system 1202. The management system 1202 may include a UAV management device (e.g., an onboard computer) for autonomously or semi-autonomously controlling and managing the UAV 1200 and, in some examples, for enabling remote control by a pilot. Portions of the management system 1202, including the UAV management device 1204, may be housed under top cover 1204. As used herein, the management system 1202 may include a power supply and assemblies (e.g., rechargeable battery, liquid fuel, and other power supplies), one or more communications links and antennas (e.g., modem, radio, network, cellular, satellite, and other links for receiving and/or transmitting information), one or more navigation devices and antennas (e.g., global positioning system (GPS), inertial navigation system (INS), range finder, Radio Detection And Ranging (RADAR), and other systems to aid in navigating the UAV 1200 and detecting objects), radio-frequency identification (RFID) capability, and interfaces capable of speech interpretation and recognition.

The UAV 1200 may also include a communication system housed within the top cover 1204. The communication system may include one or more light sensors (e.g., imaging device, depth sensor, visible light camera, infrared camera, RGB camera, depth aware camera, infrared laser projector, ultraviolet sensitive cameras, scanning sensor, light filters and any combination of the foregoing), one or more auditory sensors (e.g., microphone, noise filters, and other sensors for capturing sound), and one or more output devices (e.g., microphone, speaker, laser projector, light projector, and other devices for outputting communication information). The management system 1202 may be configured to receive information and provide information via components of the communication system. For example, the UAV 1200 may support two-way communication with users such as pilots or others.

The management device 1202 may be attached to a frame 1206. The UAV 1200 may a include propulsion system including one or more lift motor systems 1208A-1208D and one or more propulsion motor system 1210A-1210B that may also be attached to the frame 1206. The motor systems 1208 and 1210 are examples of the other motor systems described herein. Thus, each motor system 1208 and 1210 may include one or more propellers, a propeller alignment device, a motor, wiring, a balance system, a control mechanism, and other features to enable flight. In some examples, the propulsion system may operate at least partially under the control of the UAV management device 1204. In some examples, the propulsion system and/or each motor system 1208 and 1210 may be configured to adjust itself without receiving instructions from the UAV management device 1204. Thus, the propulsion system may operate semi-autonomously or autonomously. The propulsion system may enable multi-directional flight of the UAV 1200 (e.g., by adjusting each propulsion device individually).

The one or more lift motor systems 1208A-1208D may be configured to at least provide vertical lift to the UAV 1200. The one or more propulsion motor systems 1210A-1210B may be configured to at least provider forward and backward propulsion. The combination of the lift motor systems 1208 and the propulsion motor systems 1210 may enable the UAV 1200 to have multidirectional flight. The propeller alignment devices described herein may be implemented on each of the motor system 1208 and 1210 or at least one of the motor systems 1208 or 1210. In some examples, each of the one or more lift motor systems 1208A-1208D may include a propeller alignment device. In operation, after the lift motor systems 1208A-1208D lift the UAV 1200 to a particular elevation, some of the one or more lift motor systems 1208A-1208D may be turned off. At this point, the propeller alignment devices will rotate the propellers of the lift motor systems 1208A-1208D to predetermined orientations. The predetermined orientations may align the propellers with a direction of airflow when the UAV 1200 uses the propulsion motor systems 1210A and 1210B to achieve forward and backward flight. This may minimize airflow drag on the UAV 1200 attributable to these propellers. Similarly, propeller alignment devices may be installed on the propulsion motor systems 1210A and 1210B such that their respective propellers may be aligned in predetermined orientations. Such orientations may be desirable to hide the propeller behind a wing portion of the frame when the propeller is not in use. This may minimize airflow drag on the UAV 1200 attributable to the propeller.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An aerial vehicle, comprising:
a frame;
a motor connected to the frame and comprising a shaft;
a propeller connected to the shaft such that rotation of the shaft by the motor causes the propeller to rotate;
a mounting housing connected to the frame; and
an alignment structure to align the propeller relative to the mounting housing, the alignment structure comprising:
  a stationary ring secured to the mounting housing, the stationary ring comprising:
    a first magnet disposed within a first area of the stationary ring and orientated in a first direction; and
    a second magnet disposed within a second area of the stationary ring and oriented in a second direction; and
  a rotating ring aligned with the stationary ring and configured to rotate relative to the stationary ring as the propeller is rotated by the motor, the rotating ring comprising:
    a third magnet disposed within a first area of the rotating ring and oriented in the first direction; and
    a fourth magnet disposed within a second area of the rotating ring and orientated in the second direction,
wherein, in the absence of a current applied to the motor, the first and second magnets and the third and fourth magnets magnetically bias the rotating ring into a predetermined orientation.

2. The aerial vehicle of claim 1, wherein a magnetic force is produced as part of the first and second magnets and the third and fourth magnets magnetically biasing the rotating ring, the magnetic force sufficient to resist an opposing rotational force applied to the propeller when the aerial vehicle is moving.

3. The aerial vehicle of claim 1, wherein the first area of the stationary ring comprises a first c-shaped half of the stationary ring, and the second area of the stationary ring comprises a second c-shaped half of the stationary ring.

4. The aerial vehicle of claim 1, wherein each of the first magnet, the second magnet, the third magnet, and the fourth magnet comprise a plurality of cylindrical magnets, each plurality of cylindrical magnets disposed within the respective first and second areas of the stationary ring and the respective first and second areas of the rotating ring.

5. An alignment device, comprising:
a stator configured to receive a motor shaft;
a rotor configured to receive the motor shaft and rotate relative to the stator about a rotation axis that extends through the motor shaft;
a first retainer connected to the stator, the first retainer comprising a plurality of stator magnets that comprises a first set of stator magnets oriented in a first direction; and
a second retainer spaced apart from the first retainer along the rotation axis and connected to the rotor, the second retainer comprising a plurality of rotor magnets that comprises a first set of rotor magnets oriented in a second direction that is opposite the first direction,
wherein the first set of stator magnets and the first set of rotor magnets magnetically bias the rotor into a predetermined orientation about the rotation axis with respect to the stator.

6. The alignment device of claim 5, further comprising:
a second set of stator magnets of the plurality of stator magnets oriented in the second direction; and
a second set of rotor magnets of the plurality of rotor magnets oriented in the first direction,
wherein the second set of stator magnets and the second set of rotor magnets magnetically bias the rotor into the predetermined orientation.

7. The alignment device of claim 6, wherein the first set of stator magnets and the second set of stator magnets are located in respective first and second portions of the first retainer and the first set of rotor magnets and the second set of rotor magnets are located in respective first and second portions of the second retainer, and wherein in the predetermined orientation the first portion of the first retainer is aligned with the first portion of the second retainer.

8. The alignment device of claim 6, wherein the first set of stator magnets and the second set of stator magnets are intermixed throughout the first retainer and the first set of rotor magnets and the second set of rotor magnets are intermixed throughout the second retainer.

9. The alignment device of claim 8, wherein the plurality of stator magnets are inserted into a first plurality of openings in the first retainer, and the plurality of rotor magnets are inserted into a second plurality of openings in the second retainer.

10. The alignment device of claim 6, wherein the first set of rotor magnets is disposed in a first half of the second retainer and a second set of rotor magnets of the plurality of rotor magnets is disposed in a second half of the second retainer.

11. The alignment device of claim 5, further comprising:
a propeller connected to the motor shaft and connected to the rotor, wherein the first set of stator magnets and the first set of rotor magnets magnetically bias the propeller into an orientation having reduced aerodynamic resistance.

12. The alignment device of claim 11, wherein the propeller is a lift propeller and the first set of stator magnets and the first set of rotor magnets magnetically bias the propeller into the orientation when the lift propeller is not in use.

13. The alignment device of claim 5, wherein the rotor is magnetically biased into the predetermined orientation based at least in part on application of a current to one or more electromagnets of the stator.

14. The alignment device of claim 5, wherein the rotor is magnetically biased into the predetermined orientation based at least in part on application of a current to one or more electromagnets of the rotor.

15. A motor system, comprising:
a propeller;
a motor connected to the propeller, the propeller configured to rotate relative to the motor about a rotation axis in response to a current applied to the motor;
a first structure connected to the motor and comprising a first plurality of magnets, a first set of magnets of the first plurality of magnets oriented in a first direction; and
a second structure connected to the propeller and comprising a second plurality of magnets, a second set of magnets of the second plurality of magnets oriented in a second direction that is opposite the first direction,
wherein, in the absence of the current applied to the motor, the first set of magnets and the second set of magnets magnetically bias the propeller into a predetermined orientation about the rotation axis.

16. The motor system of claim 15, further comprising:
a sensor package configured to detect when the propeller is in the predetermined orientation; and
a processor configured to:
receive sensing information from the sensor package; and
in response to receiving the sensing information, apply a first current to the motor to cause the propeller to rotate with respect to the motor.

17. The motor system of claim 16, wherein the processor is further configured to determine the first current based at least in part on the sensing information.

18. The motor system of claim 15, wherein, in the predetermined orientation, the propeller has a lower energy state compared to when the propeller is out of the predetermined orientation.

19. The motor system of claim 15, further comprising:
a third set of magnets of the first plurality of magnets oriented in the second direction; and
a fourth set of magnets of the second plurality of magnets oriented in the first direction,
wherein in the absence of the current applied to the motor, the third set of magnets and the fourth set of magnets magnetically bias the propeller into the predetermined orientation.

20. The motor system of claim 19, wherein the first set magnets and the fourth set of magnets alternatingly align as the second structure rotates relative to the first structure.

* * * * *